(12) United States Patent
Wicken et al.

(10) Patent No.: US 9,679,504 B1
(45) Date of Patent: Jun. 13, 2017

(54) HELIUM FREE BALLOON ASSEMBLY

(71) Applicant: Balloon Innovations Inc., Westminster, CO (US)

(72) Inventors: Christopher J. Wicken, Golden, CO (US); Gregg A. Wicken, Littleton, CO (US)

(73) Assignee: Balloon Innovations Inc., Westminster, CO (US)

( * ) Notice: Subject to any disclaimer, the term of this patent is extended or adjusted under 35 U.S.C. 154(b) by 35 days.

(21) Appl. No.: 14/743,839

(22) Filed: Jun. 18, 2015

Related U.S. Application Data

(60) Provisional application No. 62/013,973, filed on Jun. 18, 2014.

(51) Int. Cl.
*A63H 3/06* (2006.01)
*G09F 21/06* (2006.01)
*A63H 27/10* (2006.01)

(52) U.S. Cl.
CPC ............. *G09F 21/06* (2013.01); *A63H 27/10* (2013.01)

(58) Field of Classification Search
USPC ..... 446/220, 222, 224, 225, 226; 248/309.1, 248/346.5
See application file for complete search history.

(56) References Cited

U.S. PATENT DOCUMENTS

| | | | |
|---|---|---|---|
| 262,517 A | 8/1882 | Hendrie | |
| 1,527,046 A | 10/1922 | Ingram | |
| 1,512,831 A | 10/1924 | Dunnell | |
| 1,535,396 A | 4/1925 | Buehler | |
| 1,648,338 A | 11/1927 | Noel | |
| 1,677,379 A | 7/1928 | Louis | |
| 1,782,070 A | 11/1930 | Lazarus | |
| 1,788,157 A | 1/1931 | Hogan | |
| 2,143,691 A | 4/1938 | Goldberg et al. | |
| 2,209,875 A | 7/1940 | Eichelsdoerfer | |
| 2,488,396 A | 11/1949 | Gottholm | |
| 2,664,667 A | 1/1954 | Burroughs | |
| 2,840,948 A | 7/1958 | Stickley | |
| 2,922,252 A | 1/1960 | Dam | |
| 2,924,041 A | 2/1960 | Jackson | |
| 3,150,460 A | 9/1964 | Dees | |
| 3,162,409 A | 12/1964 | Straayer | |
| 3,192,568 A | 7/1965 | Nicholls | |
| 3,366,999 A | 2/1968 | Darby | |
| 3,439,079 A | 4/1969 | McDowell | |
| 3,892,081 A * | 7/1975 | Goral ..................... | G09F 21/06 116/63 P |

(Continued)

FOREIGN PATENT DOCUMENTS

WO    2015195981 A1    12/2015

OTHER PUBLICATIONS

U.S. Appl. No. 14/742,855, filed Jun. 18, 2015, First Inventor: Christopher J. Wicken.

(Continued)

*Primary Examiner* — Kurt Fernstrom
(74) *Attorney, Agent, or Firm* — Santangelo Law Offices, P.C.

(57) ABSTRACT

The inventive technology disclosed herein includes methods and apparatus for novel and unique helium-free balloon support assemblies as well as complementary support systems that may be used to display one or more helium-free balloons.

46 Claims, 12 Drawing Sheets

(56) References Cited

U.S. PATENT DOCUMENTS

| | | | |
|---|---|---|---|
| 3,920,207 | A | 11/1975 | Adamaitis |
| 4,035,462 | A | 7/1977 | Lane, Jr. |
| 4,542,445 | A * | 9/1985 | Marletta ............... F21L 11/00 362/206 |
| 4,589,854 | A * | 5/1986 | Smith .................... A63H 27/10 40/214 |
| 4,712,510 | A | 12/1987 | Tae-Ho |
| 4,794,498 | A * | 12/1988 | Neumeier ............. A63H 27/10 362/186 |
| 4,895,545 | A * | 1/1990 | Nelson .................. A63H 27/10 206/315.1 |
| 1,953,719 | A | 9/1990 | Yaffe |
| 4,953,713 | A | 9/1990 | Yaffe |
| 5,027,992 | A | 7/1991 | Murray |
| 5,036,985 | A | 8/1991 | Lovik |
| 5,052,733 | A | 10/1991 | Cheung et al. |
| 5,127,867 | A | 7/1992 | Lau |
| 5,188,332 | A | 2/1993 | Callas |
| 5,203,530 | A * | 4/1993 | Liu ........................ A63H 27/10 248/309.1 |
| 5,234,726 | A | 8/1993 | Dahan |
| 5,282,768 | A | 2/1994 | Akman |
| 5,564,575 | A | 10/1996 | Casement |
| 5,575,470 | A | 11/1996 | Sherman |
| 5,746,461 | A | 5/1998 | Broberg |
| 5,769,474 | A | 6/1998 | Moore |
| 5,823,365 | A | 10/1998 | Page |
| 5,873,764 | A | 2/1999 | Scherr |
| 5,938,255 | A | 8/1999 | Rose et al. |
| 5,944,576 | A | 8/1999 | Nelson et al. |
| 6,176,758 | B1 | 1/2001 | Wu |
| 6,273,479 | B1 | 8/2001 | Carlson |
| 6,478,057 | B1 | 11/2002 | Bearss et al. |
| 6,478,651 | B1 | 11/2002 | Weir |
| 6,745,904 | B1 | 6/2004 | Komar |
| 6,923,141 | B1 | 8/2005 | Staats |
| 6,935,268 | B1 | 8/2005 | Hawkins |
| 6,938,871 | B1 | 9/2005 | Carlson |
| 6,969,295 | B1 | 11/2005 | Sidwell |
| D517,123 | S | 3/2006 | Sidwell |
| 7,017,511 | B2 | 3/2006 | Fisher |
| 7,249,991 | B1 | 7/2007 | Watson |
| 7,588,477 | B2 | 9/2009 | Sidwell |
| 7,611,395 | B2 | 11/2009 | Bonsabiante |
| D610,208 | S | 2/2010 | Hou |
| 7,810,265 | B2 | 10/2010 | Beatty |
| 7,854,642 | B2 | 12/2010 | Nelson et al. |
| 7,922,116 | B2 * | 4/2011 | Nguyen ................. F21V 3/023 244/24 |
| 7,967,344 | B2 | 6/2011 | Herren |
| 8,152,588 | B2 | 4/2012 | Hua |
| D659,200 | S | 5/2012 | Wicken |
| 8,544,407 | B2 | 10/2013 | Spray |
| 8,789,565 | B1 | 7/2014 | Wicken |
| 8,840,440 | B2 | 9/2014 | Pierce |
| 8,968,047 | B1 | 3/2015 | Wicken |
| 9,087,462 | B1 | 7/2015 | Gallus |
| 9,089,784 | B2 | 7/2015 | Nelson |
| 9,132,595 | B1 | 9/2015 | Wicken et al. |
| 2001/0045074 | A1 | 11/2001 | Kim |
| 2003/0071185 | A1 | 4/2003 | Casapulla |
| 2004/0077268 | A1 | 4/2004 | Wainohu |
| 2006/0011793 | A1 | 1/2006 | Dupuis |
| 2006/0289707 | A1 * | 12/2006 | Greenwald ............ A63H 27/10 248/127 |
| 2006/0292960 | A1 | 12/2006 | Muller |
| 2007/0007424 | A1 | 1/2007 | Sifferlin et al. |
| 2007/0049158 | A1 * | 3/2007 | Chou ..................... A63H 27/10 446/220 |
| 2007/0218802 | A1 | 9/2007 | Gronethal et al. |
| 2008/0121309 | A1 * | 5/2008 | Boise .................... A63H 27/10 141/313 |
| 2008/0166942 | A1 | 7/2008 | Hou |
| 2008/0166943 | A1 | 7/2008 | Hou |
| 2009/0197502 | A1 | 8/2009 | Nelson et al. |
| 2009/0296372 | A1 * | 12/2009 | Schrimmer ............ A63H 27/10 362/96 |
| 2011/0240823 | A1 | 10/2011 | Hua |
| 2011/0290171 | A1 | 12/2011 | Brick |
| 2012/0015581 | A1 | 1/2012 | Feldstein |
| 2012/0211614 | A1 | 8/2012 | Parello, Jr. |
| 2014/0096867 | A1 * | 4/2014 | Cayton ................... F21S 10/02 141/98 |
| 2016/0189578 | A1 | 6/2016 | Wicken |
| 2016/0214023 | A1 | 7/2016 | Wicken |
| 2016/0220917 | A1 | 8/2016 | Wicken |

OTHER PUBLICATIONS

U.S. Appl. No. 14/840,612, filed Jun. 16, 2015, First Inventor: Christopher J. Wicken.
U.S. Appl. No. 14/635,898, filed May 30, 2015, First Inventor: Christopher J. Wicken.
U.S. Appl. No. 14/201,665, filed Mar. 7, 2014, First Inventor: Christopher J. Wicken.
U.S. Appl. No. 61/774,344, filed Mar. 7, 2013, First Inventor: Christopher J. Wicken.
U.S. Appl. No. 14/743,839, filed Jun. 18, 2015, First Inventor: Christopher J. Wicken.
Amazon: Arizona Balloons; Jan. 24, 2013.
Free Patents Online IP Research & Communities—Rotational Molding; Jan. 24, 2013.
Giant Advertising Balloons; Jan. 24, 2013.
Polyurethane Balloons—Balloon Country; Jan. 24, 2013.
Professional Weather Balloons, 3, 8, and 16 Foot Diameters, Edmund Scientific; Jan. 24, 2013.
Roto-Balloon Printing; Jan. 24, 2013.
Weather Balloons—NovaLynx Corporation; Jan. 24, 2013.
Design U.S. Appl. No. 29/4444,898, filed Feb. 5, 2013, First Inventor: Christopher J. Wicken.
Free Patents Online IP Research & Communities—Rotomolding; Jan. 24, 2013.
International Application No. PCT/US15/036527, filed Jul. 21, 2015, First Inventor: Christopher J. Wicken.
International Application No. PCT/US15/036527, filed Jul. 21, 2015 entitled "Modular Balloon Support". Search Report dated Sep. 30, 2015, 4 pages.
International Application No. PCT/US15/036527, filed Jul. 21, 2015 entitled "Modular Balloon Support", Written Opinion dated Sep. 30, 2015, 14 pages.
U.S. Appl. No. 14/740,612, filed Jun. 18, 2015, First Inventor: Christopher J. Wicken.
U.S. Appl. No. 14/931,631, filed Nov. 3, 2015, First Inventor: Christopher J. Wicken.
U.S. Appl. No. 15/076,182, filed Mar. 21, 2016, First Inventor: Christopher J. Wicken.
U.S. Appl. No. 14/946,246, filed Nov. 19, 2015, First Inventor: Christopher J. Wicken.
U.S. Appl. No. 14/831,759, filed Aug. 20, 2015, First Inventor: Christopher J. Wicken.
U.S. Appl. No. 62/039,737, filed Aug. 20, 2014, First Inventor: Christopher J. Wicken.
U.S. Appl. No. 14/853,224, filed Sep. 14, 2015, First Inventor: Christopher J. Wicken.
U.S. Appl. No. 62/013,973, filed Jun. 18, 2014, First Inventor: Christopher J. Wicken.
Balloons Everywhere, Everyday Catalog & Buyers Guide. Wholesale Balloons & Floral Accessories. © 2007, 2008 Balloons Are Everywhere, Inc. 10 pages.
U.S. Appl. No. 15/178,434, filed Jun. 9, 2016. First Named Inventor: Christopher J. Wicken.

* cited by examiner

Fig. 4A
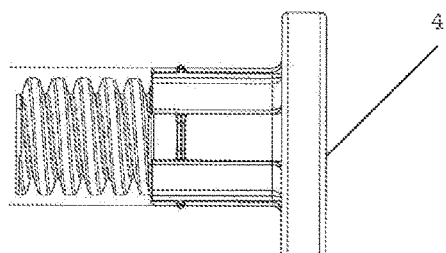
Fig. 4B
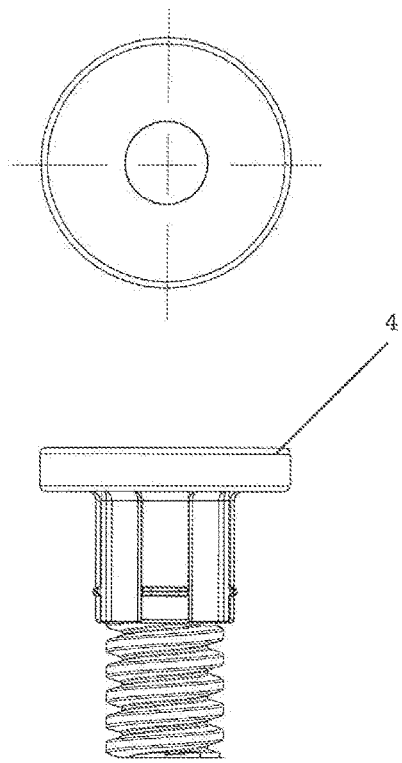
Fig. 4C
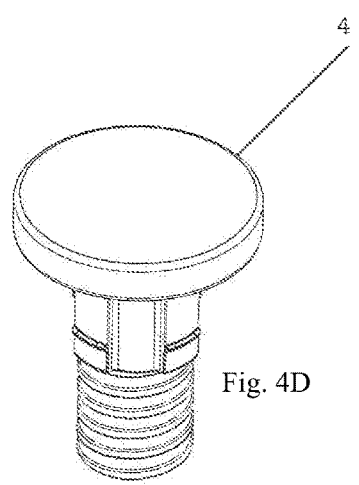
Fig. 4D
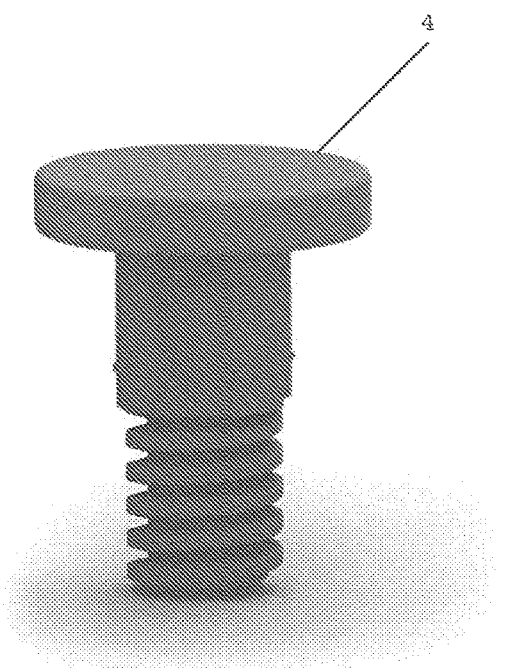
Fig. 4E Fig 5A
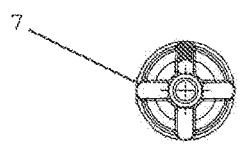
Fig. 5B
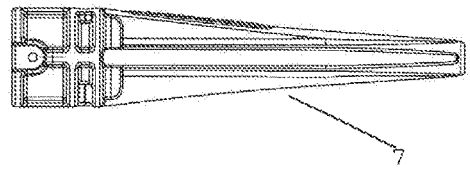
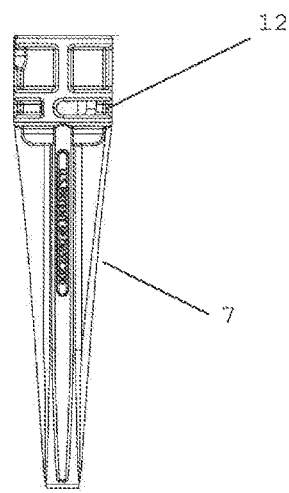
Fig. 5C
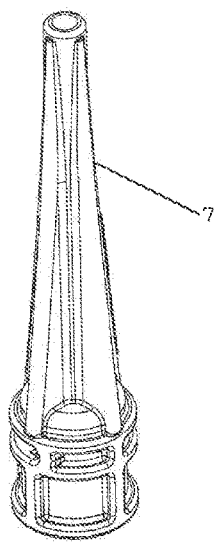
Fig. 5D
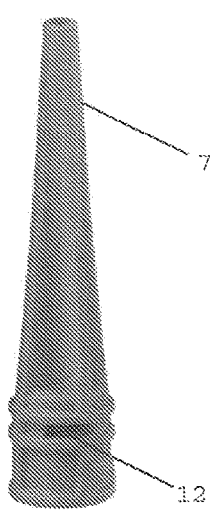
Fig. 5E

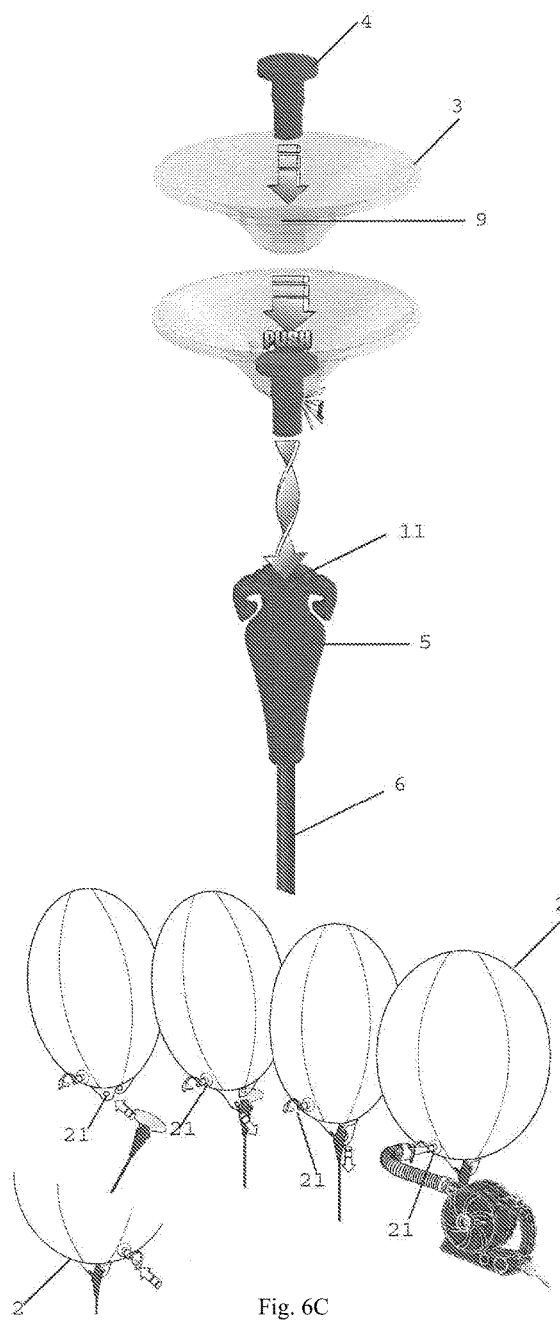
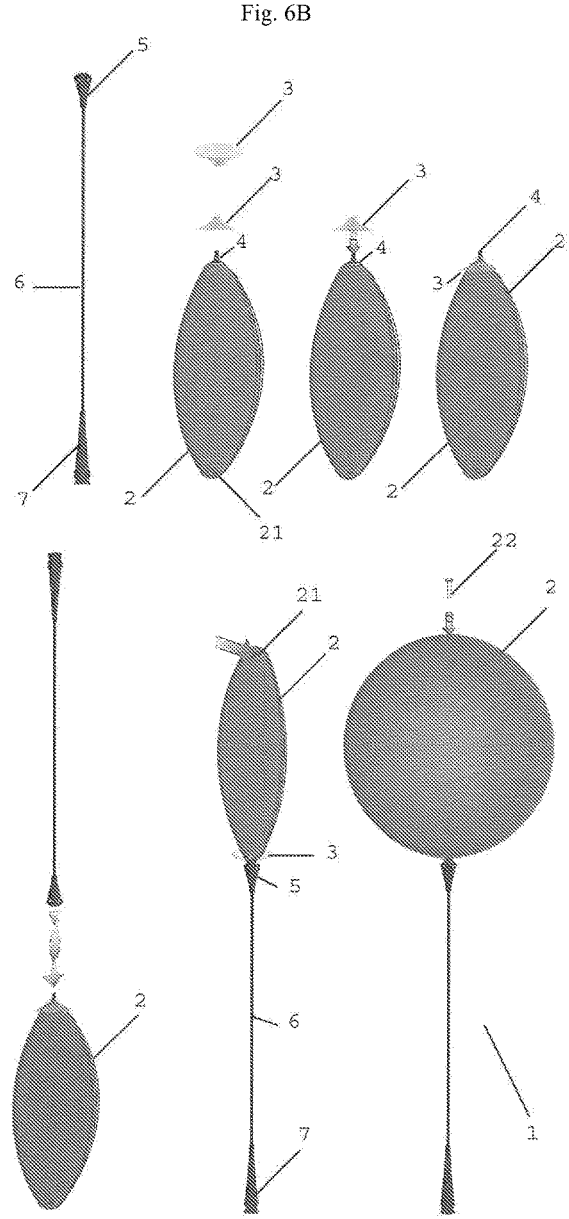
Fig. 6A
Fig. 6B
Fig. 6C
Fig. 6D

US 9,679,504 B1

HELIUM FREE BALLOON ASSEMBLY

Parts of this application claim the benefit of and priority to U.S. Provisional Application No. 62/013,973 filed Jun. 18, 2014. The entire specification and figures of the above-mentioned application is hereby incorporated, in its entirety by reference.

TECHNICAL FIELD

Generally, the inventive technology disclosed herein relates to a novel and unique balloon assembly. In a preferred embodiment, the invention may be used to support, for example, helium-free balloons and display systems that are positioned inside and/or outside commercial establishments to attract attention and/or highlight a specific promotion or event. More specifically, the inventive technology, in a preferred embodiment, described generally herein relates to an improved helium-free balloon assembly that may be used to position, secure and display marketing attractants. This inventive technology may be particularly suited for helium-free balloons and other marketing display systems that are positioned outside commercial establishments to attract attention and/or highlight a specific promotion or event. In certain embodiments, such assemblies may mimic the action and presentation of traditional helium balloons and the like.

BACKGROUND OF THE INVENTION

Traditional external marketing assemblies are commonly employed to promote various commercial or organizational interests as well as events. For example, traditional external marketing devices may include some type of large object, such as signs, placards or novelty attention-grabbing devices that may be placed outside to catch a passerby's attention thereby promoting a certain business or event. In recent years, various inflatable external marketing devices have been deployed as marketing devices to attract public attention. Example of such air-filled based systems may include external balloon systems, as well as large inflatable figures or structures. Despite their use, such large inflatable devices have several drawbacks that limit their uses.

First, traditional large inflatable devices are typically expensive and simply not cost effective for most businesses to purchase for a specific promotion or event. As a result, most traditional large inflatable devices must be rented for short periods of time. This fact also limits the ability to personalize any large inflatable devices for a specific event or promotion.

Second, traditional large inflatable devices must be constantly re-inflated through one or more air pumps and/or blowers. Because of their dependence on such constant re-inflation, use of such large inflatable devices is limited by their access to adequate electrical power to re-inflate the devices. Moreover, the electrical costs can also be prohibitive over a long course of time further limiting the large inflatable devices' ability to be deployed for an extended period of time.

Third, traditional helium-based large inflatable devices are not cost effective. For example, a lack of private sector helium producers, federal regulations and decline in U.S. Federal Helium Reserves have resulted in significant price increases and dwindling supplies of commercially available helium. Much of the available helium gas is currently being diverted to industrial and/or medical uses, such as MRI's, cryogenic preservation as well as scientific applications such as particle accelerators. Under these conditions, it is simply not cost effective to continue production of helium-dependent inflatable marketing systems. As can be seen, there is a need for a single comprehensive solution to the limitations described above.

The current invention overcomes these limitations of, and indeed surpasses the functionality of such traditional external marketing assemblies. It is therefore the object of the present invention to provide a simple, versatile, easily-inflatable, modular, cost effective helium-free balloon assembly that may be compatible with a variety of attachment surfaces and may be used both inside and outdoors. In addition, such assembly may be configured to support larger and heavier balloons while still providing the aesthetic appearance and motion of a lighter than air display. Accordingly, the objects of the methods and apparatus described herein address each of the aforementioned problems and goals in a practical manner. Naturally, further objects of the inventive technology will become apparent from the description and drawings below.

SUMMARY OF INVENTION

It is the object of the present invention to provide a helium-free balloon assembly to address the comprehensive concerns outlined above. Additional objects of the current invention may also provide various display support assemblies. As one of several preferred embodiments, the inventive technology may provide various helium-free balloon assemblies (1). In one preferred embodiment, the invention may include a helium-free balloon assembly (1) having a helium-free balloon (2) configured to be supported by a balloon support (3) which may be further coupled with a coupler (4). In this preferred embodiment, this coupler (4) may be secured to a rod coupler (5), or directly to a rod (6), such as a flexible fiberglass rod or even a support pole (8) or other support. This rod (6) may further be coupled with a rod handle (7) or even an attachment surface, such as the ground or a weighted stand or even a support pole (8) through, for example a slide lock (12).

In another preferred embodiments, seamed and/or seamless helium-free balloons, such as those described in U.S. patent application Ser. No. 14/201,665, (which is incorporated herein in its entirety.) may be utilized. In certain embodiment, such helium-free balloons may have integral or attachable balloon latches (10) that may be secured to one or more fasteners (11) on said rod coupler (5) or rod (6). Such helium-free balloons may be inflated through the use of inflation ports (21) and plugs (22), or in some instances, a separate inflation valve (19) that may be integral with or a separate component coupled with a balloon support (3) or even a helium-free balloon (2) or other component.

Another embodiment may include a balloon support coupler (23) having one or more support extensions (18) that may be coupled with an internal fitting (20). In this embodiment, an inflation valve (19) may be positioned within a balloon support coupler (23) allowing the attached helium-free balloon to be inflated while coupled. In certain embodiments, this inflation valve (19) may be integral with the support coupler (23), while in other embodiments it may be a separate system component.

Additional embodiments may include a vertical rod support (14) that may support one or more balloon assemblies. In a preferred embodiment, such a vertical rod support (14) may include a single, or even a plurality of rod apertures (15) configured to secure a balloon assembly rod (6), rod handle (7), support pole (8) or even a coupler (4). In this preferred embodiment, one or more vertical rod supports (14) may be affixed to an any attachment surface, which may be vertical or not, through one or more support attachment position (16) or adhesive attachment positions (17), or both.

BRIEF DESCRIPTION OF THE DRAWINGS

FIG. 4A: is a top view of a coupler in one embodiment thereof;

FIG. 4B: is a side view of a coupler in one embodiment thereof;

FIG. 4C: is a side view of a coupler in one embodiment thereof;

FIG. 4D: is a perspective view of a coupler in one embodiment thereof;

FIG. 4E: is a front perspective view of a coupler in one embodiment thereof;

FIG. 5A: is a top view of a rod handle in one embodiment thereof;

FIG. 5B: is a side view of a rod handle in one embodiment thereof;

FIG. 5C: is a side view of a rod handle in one embodiment thereof;

FIG. 5D: is a perspective view of a rod handle in one embodiment thereof;

FIG. 5E: is a front perspective view of a rod handle in one embodiment thereof;

FIG. 6A: is a helium free balloon assembly in one embodiment thereof;

FIG. 6B: is a helium free balloon assembly in one embodiment thereof;

FIG. 6C: is a helium free balloon assembly in one embodiment thereof;

FIG. 6D: is a helium free balloon assembly in one embodiment thereof;

DETAILED DESCRIPTION OF THE INVENTION

Figure 1:
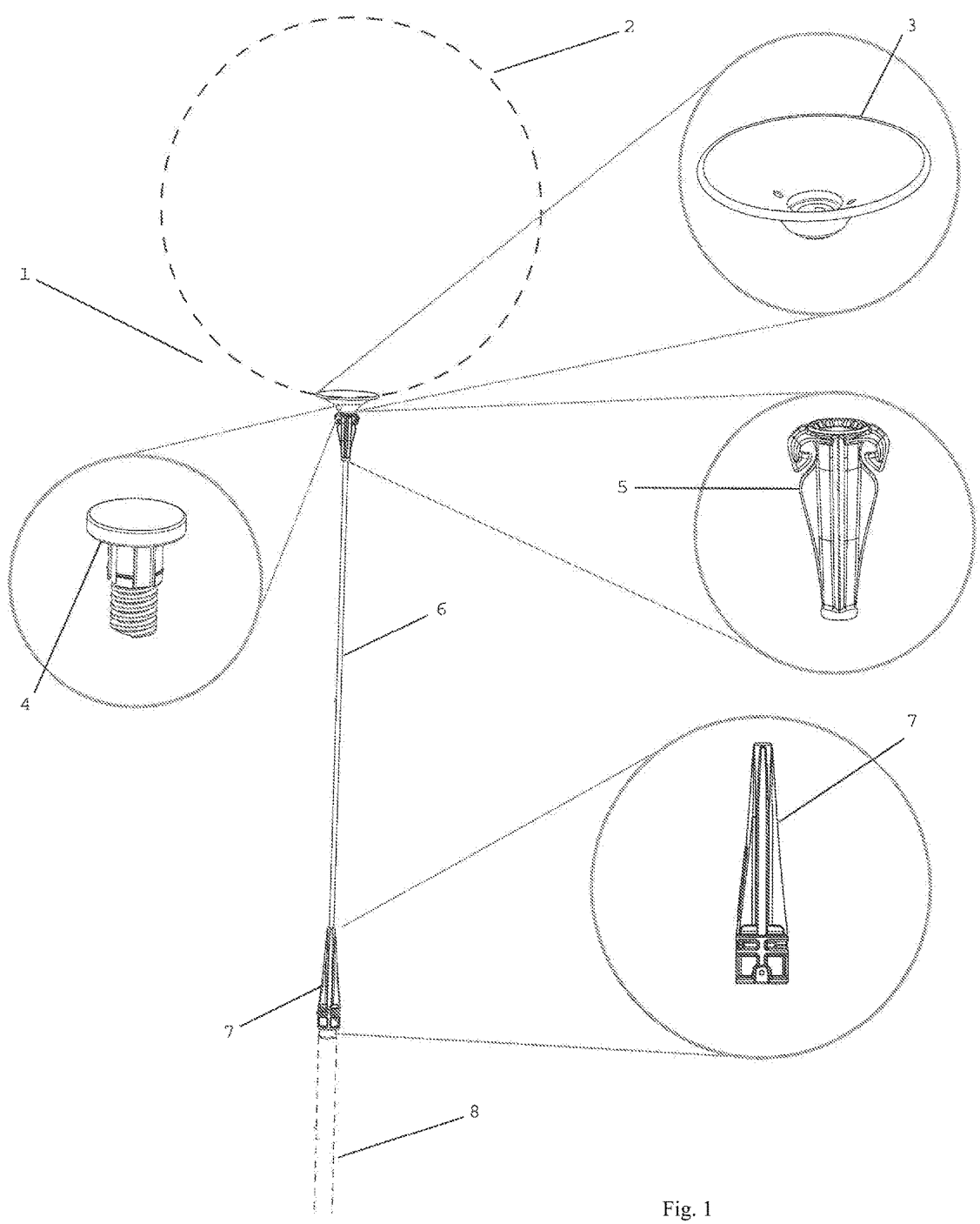
FIG. 1: is a helium-free balloon assembly with individual components in exploded views in one embodiment thereof.
Figure 2A:
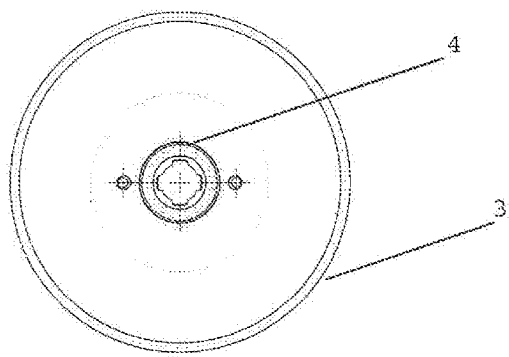
FIG. 2A: is a top view of a balloon support in one embodiment thereof.
Figure 2B:
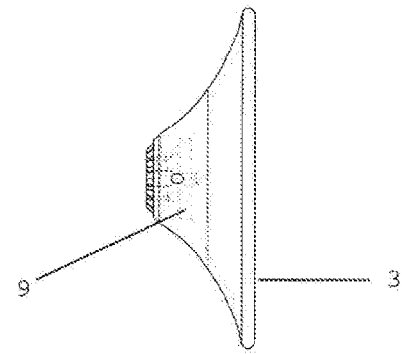
FIG. 2B: is a side view of a balloon support in one embodiment thereof.
Figure 2C:
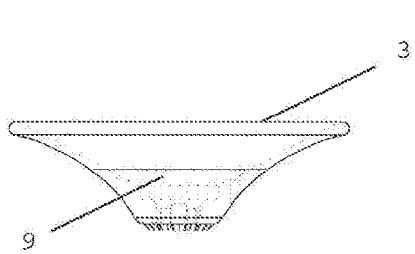
FIG. 2C: is a side view of a balloon support in one embodiment thereof.
Figure 2D:
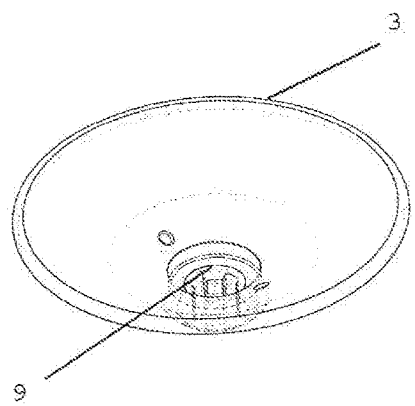
FIG. 2D: is a perspective view of a balloon support in one embodiment thereof.
Figure 2E:
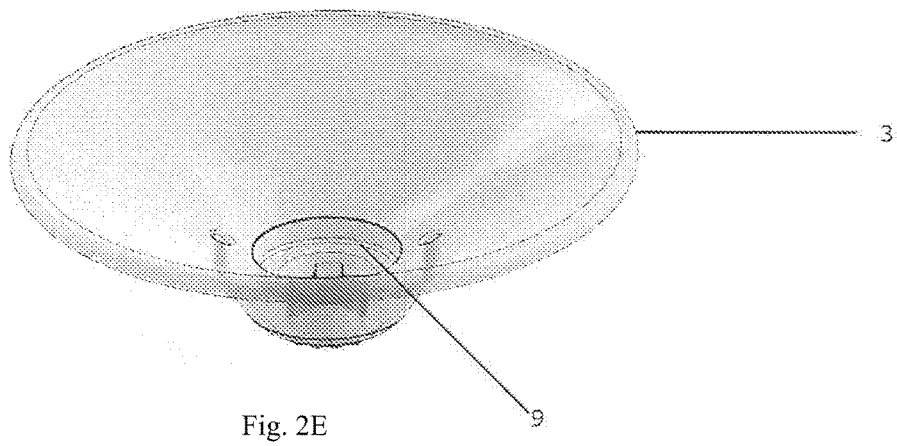
FIG. 2E: is a perspective view of a balloon support in one embodiment thereof.
Figure 3A:
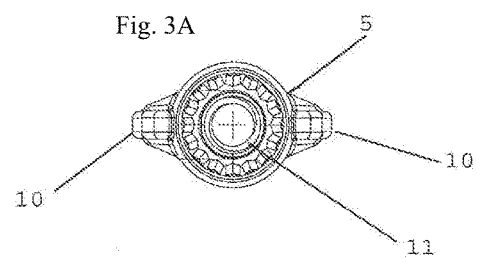
FIG. 3A: is a top view of a rod coupler in one embodiment thereof.
Figure 3B:
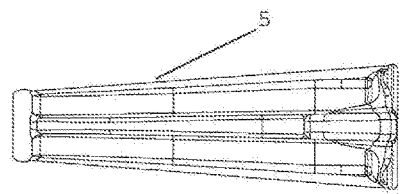
FIG. 3B: is a side view of a rod coupler in one embodiment thereof.
Figure 3C:
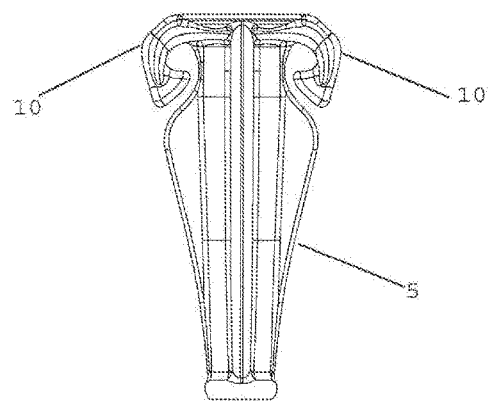
FIG. 3C: is a front view of a rod coupler in one embodiment thereof.
Figure 3D:
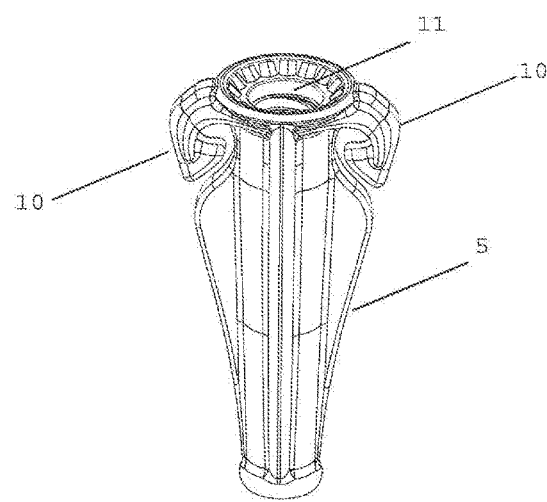
FIG. 3D: is a perspective view of a rod coupler in one embodiment thereof.
Figure 3E:
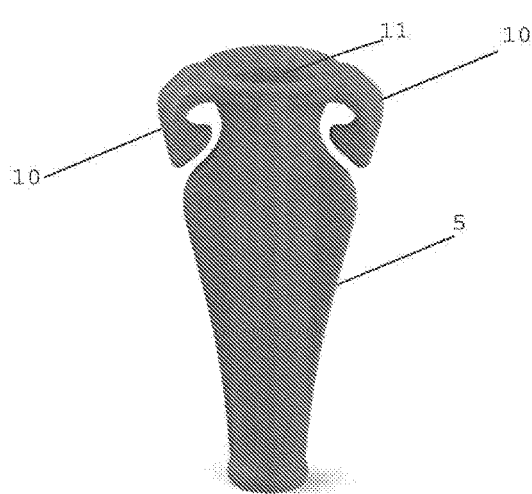
FIG. 3E: is a front perspective view of a rod coupler in one embodiment thereof.

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Generally referring to FIGS. 1-6, in one embodiment the inventive technology may provide for a helium-free balloon assembly (1). (Naturally, as noted elsewhere, while such support assemblies may, in some preferred embodiments include helium-free balloons, any such display or object may be coupled with, supported by, or even adapted to the inventive technology.) In a preferred embodiment, a helium-free balloon (2) may be coupled with and supported by at least one balloon support (3). In this embodiment, such a balloon support (3) may provide support for the helium-free balloon to maintain its shape as well as helping to mimic the appearance of a "floating" helium-filled balloon. In this embodiment a balloon support (3) may be substantially circular and have a slightly concave configuration so as to conform to the circular shape of this exemplary balloon. Naturally, a variety of materials as well as shapes and configurations may be contemplated. For example, in certain embodiments, such a balloon support may include shaped, planar balloon supports to conform to non-circular helium-free balloons or other displays, as well as non-continuous supports and or frames. Certain embodiments may include a scalloped balloon support (3) as demonstrated in FIG. 10. In certain embodiments the balloon support (3) may be integral with the helium-free balloon (2) or even attachable/detachable. As shown in FIG. 2, in a preferred embodiment a balloon support (3) may be formed of a clear plastic material, though other opaque plastic, and/or composite materials may be used.

Referring generally to FIGS. 2-4 and 6, in one embodiment a helium-free balloon assembly (1) may include a coupler (4). In this embodiment, this coupler (4) may be configured such that it may be coupled with, or secured by a balloon support (3). In the preferred embodiment shown in FIG. 6, a coupler (4) may be inserted into a balloon support (3) until it engages and is coupled with a coupler channel (9). As shown in this embodiment, this coupler channel (9) may be an integral channel around an aperture such that it may form a fitted seal with, in this case the extended head of the coupler (4). Additional embodiments may include a variety of coupling mechanisms whereby a coupler (3) and balloon support (3) may be coordinated, such as a threaded coupler channel, a twist lock coupler channel, a snap fit coupler channel and the like.

Again, as demonstrated in FIGS. 4 and 6, in certain embodiments a coupler (4) may further be secured to a rod coupler (5). In a preferred embodiment shown in the figures, a coupler (4) may engage with a fastener (11) position on the rod coupler (5). In a preferred embodiment, for example a threaded portion shown in FIG. 2 may correspond to a threaded fastener (11) on a corresponding rod coupler (5) such that the two elements may be secured to one another.

Additional coupling mechanisms may be contemplated as part of the inventive technology. For example, in certain embodiments the coupler may include: a fitted coupler configured to form a fitted coupling on a corresponding rod coupler (5); a twist lock coupler configured to form a twist lock coupling on a corresponding rod coupler (5); a snap lock coupler configured to form a snap lock coupling on a corresponding rod coupler (5); a flexible coupler configured to form a flexible coupling on a corresponding rod coupler (5) allowing rotational or lateral movement of the joint; and a quick release coupler configured to form a quick release coupling on a corresponding rod coupler (5) and the like. In addition, in certain embodiments a coupler (4) may also be a valve. In this embodiment, a helium-free balloon may be joined with a coupler (4) that may also act as a valve such that when the balloon is secured with, in this case a balloon support (3) and corresponding coupler (4), (or in some instances, just a coupler having a valve) it may be inflated and/or deflated.

Referring now to FIGS. 1 and 6, in certain embodiments a rod coupler (5) may be secured with a rod (6). In certain embodiments, this coupling may be transient, such that the two elements may be coupled and decoupled, for example through a threaded coupling, a twist coupling, a snap coupling, a slide coupling, or even a fitted coupling or the like. Naturally, as discussed above, in some embodiment a coupler (4) may be secured directly to a rod (6) through any of the aforementioned coupling mechanisms. Again referring to FIGS. 1 and 6, in some embodiments a rod coupler (5) may be secured with a rod (6) through an overmold. In this embodiment, two disparate elements are brought together and a layer of material, such a composite or other plastic resin is overmolded over the elements coupling or joining them together. Typically, in a traditional overmolding process a component part or product, such as rod coupler (5) and rod (6), may be placed into a mold and a thermoplastic resin is injected into the void space between the component part and cores of the mold. By this general process a molten resin may be molded around the component part's outer surface coupling the components in this instance. Additionally, a rod coupler (5) may, in some embodiments be secured with a rod (6), may be coupled with adhesives, or even manufactured so as to be integral to one another, such that they form a unitary single component. In a preferred embodiment, a flexible fiberglass rod may be secured to a plastic rod coupler (5) though a thermoplastic overmold.

It should be noted that for purposes of the inventive technology, the term rod (6) may encompass a variety of support elements. For example, as noted above, in a referred embodiment a rod (6) may include a flexible fiberglass rod, that may exhibit lateral movement mimicking the movement of a helium balloon in response to, for example a wind force. However, additional embodiments may include stationary rods or poles, support poles (8) jointed rods or poles, a support plate; and a ground stake; and even a support stand, such as a weighed support stand. In certain embodiments, a coupler (2), or even balloon support (3) may be coupled directly with any of these elements directly, or even indirectly.

Referring now to FIGS. 1, 5 and 6, in some embodiments, a helium-free balloon support assembly (1) may include one or more rod handles (7). In a preferred embodiment, a rod handle (7) may be configured to be coupled with a rod (6). Such coupling may include a variety of mechanical coupling configurations previously discussed, as well as adhesive couplings and the like. In a preferred embodiment, a rod handle (7) may be coupled with a rod (6) through an overmold, while in other embodiments, similar to the rod coupler (5), may be an integral component. (The term couple/coupling and secure/securing also encompass such integral component configurations).

Referring specifically to FIGS. 1 and 5, in one embodiment a rod handle (7) may be coupled with a support pole (8). In a preferred embodiment, this may be accomplished through a slide lock (12), as well as the other mechanical, adhesive or overmolded couplings previously discussed. Similar to the previously discussed rod (6), in certain elements a support pole (8) may include a variety of supports some of which do not have a linear pole configuration. For example, in certain embodiments, support pole (8) may include a flexible support pole; a stationary support pole; a jointed support pole; a support plate or extender such as those described in U.S. patent application Ser. No. 14/742,855, which is incorporated herein by reference), a ground stake; and/or a support stand.

Figure 7A:
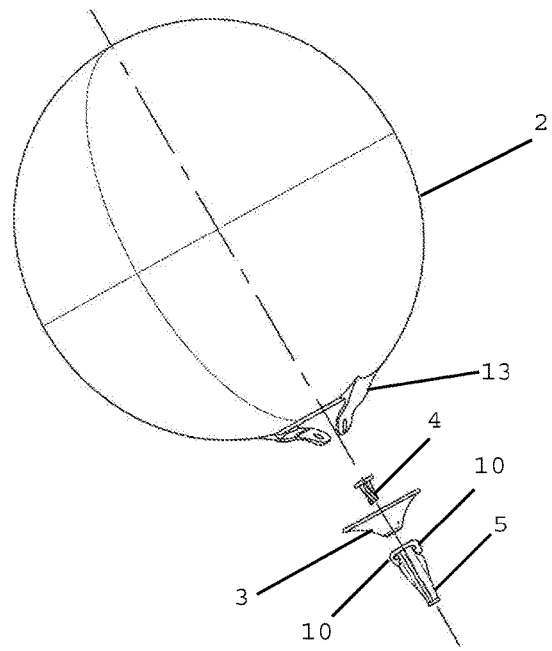
FIG. 7A: is an exploded view of a helium-free balloon having a plurality of balloon latches being coupled with a rod coupler in one embodiment thereof.
Figure 7B:
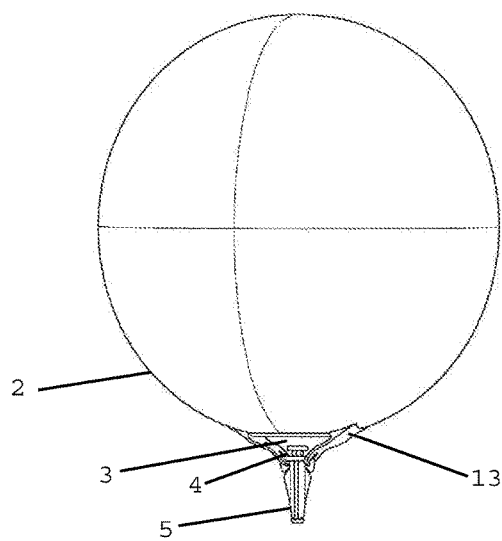
FIG. 7B: is a helium-free balloon having a plurality of balloon latches being coupled with a rod coupler in one embodiment thereof.
Figure 7C:
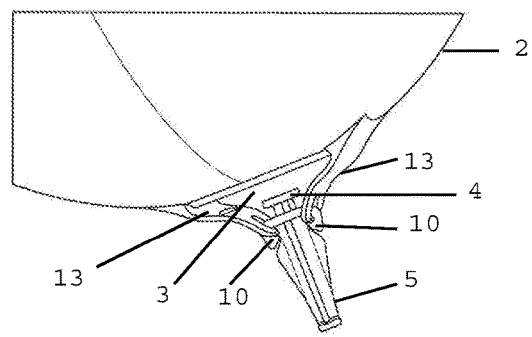
FIG. 7C: is a close up view of a helium-free balloon having a plurality of balloon latches being coupled with a rod coupler in one embodiment thereof.
Figure 8A:
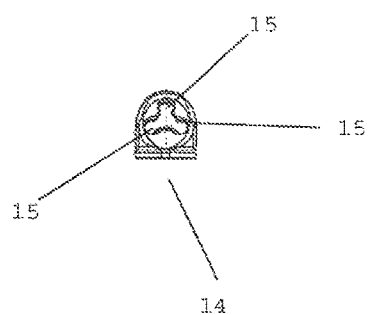
FIG. 8A: is a top view of an isolated vertical rod support in one embodiment thereof.
Figure 8B:
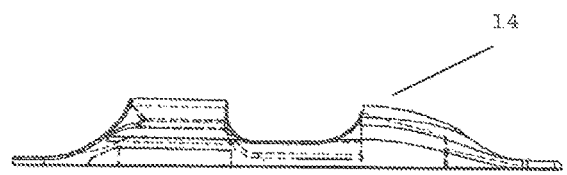
FIG. 8B: is a side view of an isolated vertical rod support in one embodiment thereof.
Figure 8C:
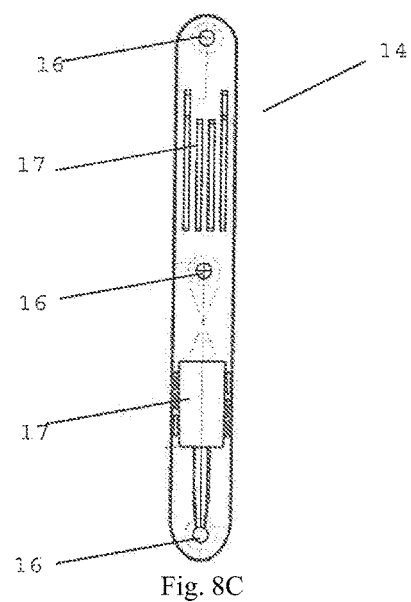
FIG. 8C: is a back view of an isolated vertical rod support in one embodiment thereof.
Figure 8D:
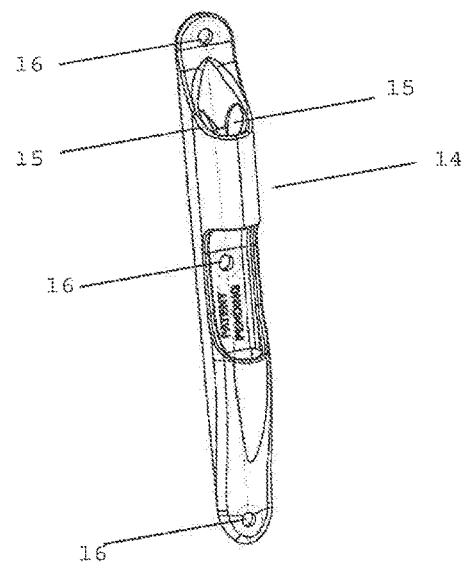
FIG. 8D: is a perspective view of an isolated vertical rod support in one embodiment thereof.
Figure 9A:
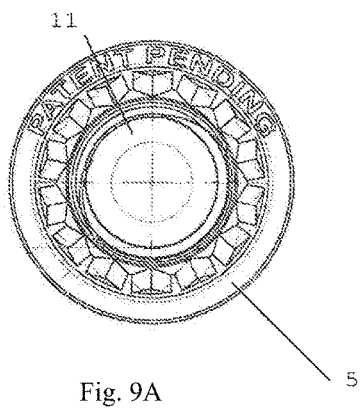
FIG. 9A: is a top view of a rod coupler having a threaded fastener in one embodiment thereof.
Figure 9B:
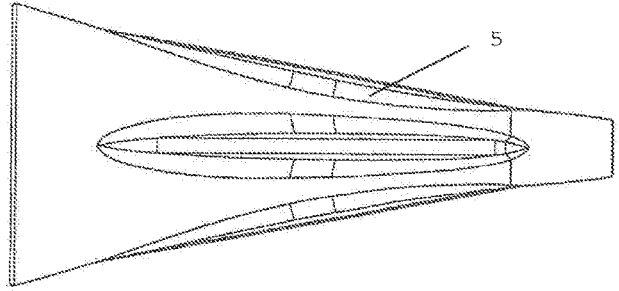
FIG. 9B: is a side view of a rod coupler having a threaded fastener in one embodiment thereof.
Figure 9C:
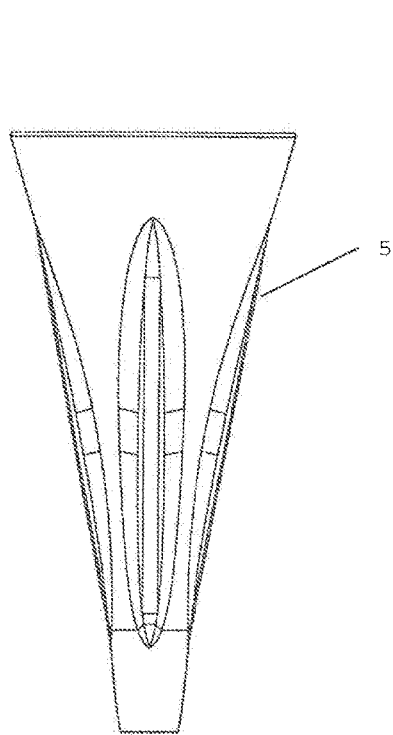
FIG. 9C: is a front view of a rod coupler having a threaded fastener in one embodiment thereof.
Figure 9D:
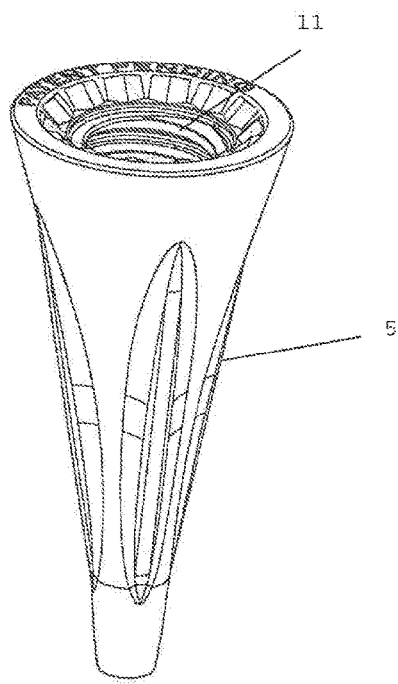
FIG. 9D: is a perspective view of a rod coupler having a threaded fastener in one embodiment thereof.
Figure 10A:
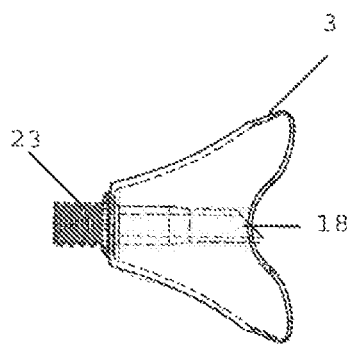
FIG. 10A: is a side view of a balloon support having a support extension in one embodiment thereof.
Figure 10B:
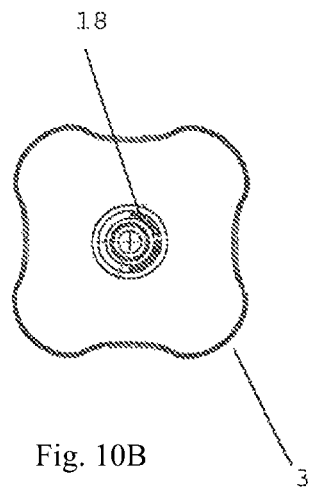
FIG. 10B: is a top view of a balloon support having a support extension in one embodiment thereof.
Figure 10C:
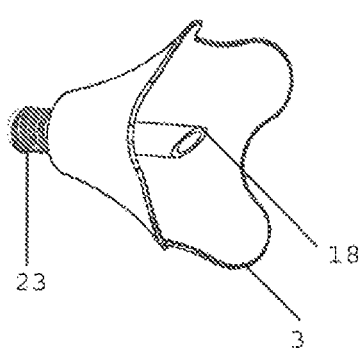
FIG. 10C: is a perspective view of a balloon support having a support extension in one embodiment thereof.
Figure 10D:
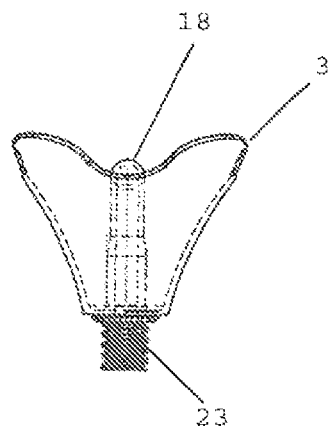
FIG. 10D: is a front transparent view of a balloon support having a support extension in one embodiment thereof.

Referring to FIG. 6-7, in certain embodiments the inventive technology may include the ability to secure one or more helium-free balloons (2) to other components so as to secure its position in the assembly. In one preferred embodiment, a helium-free balloon (2) may include one or more helium-free balloon handles (13). In this embodiment, such helium-free balloon handles (13) may be integral with the helium-free balloons' surface, or attachable or detachable or transient. While such handles are formed of similar or even identical material as the helium-free balloon (2), in this preferred embodiment the handles may be sufficiently elastic in nature so as to be able to be secured with at least one balloon latch (10) on a rod coupler (5). In this embodiment, the balloon handles (13) exert a downward force on the helium-free balloon (2) causing it to be more tightly secured to, in this instance a balloon support (3). In this embodiment, the action of the balloon handles (13) and balloon support (3) may help the balloon maintain its shape, for example in external environments. For example, wind force as well as temperature fluctuations as well as natural air loss from the balloon may cause deformation of the balloons' shape and detracts from the overall aesthetic appearance as well as illusion of being a helium, or lighter-than-air balloon. Such handles also may provide the ability to quickly attach and detach helium-free balloons (2) making it easier to remove assembly or disassemble the display, or change between different balloon colors or shapes.

As shown in FIG. 6D, in another preferred embodiment, a coupler (4) may be secured within a balloon aperture, such as can be accomplished through rotationally molding a helium-free balloon (2) with an integrated coupler (4) such as those described in U.S. patent application Ser. No. 14/201,665 (which is incorporated herein in its entirety). As described above, this integrated coupler (4) may include an attachment position, such as a threaded portion that may be coupled with, in this embodiment a rod coupler (5) or other component. In an embodiment where this coupler (4) is a valve, the balloon may be inflated directly through the valve. In embodiments where this coupler does not have this valve function, the corresponding balloon may be inflated through an inflation support (21) and, for example an attached or separate plug (22). In this embodiment, a helium-free balloon (2) may be secured to a rod coupler (5), rod, or other component directly through the coupler (4). In this configuration, the helium-free balloon (2) may be positioned so as to be supported by, in this instance a circular concave balloon support (3) without any additional balloon handles (13) or other coupling devices.

Figures 11A, 11B:
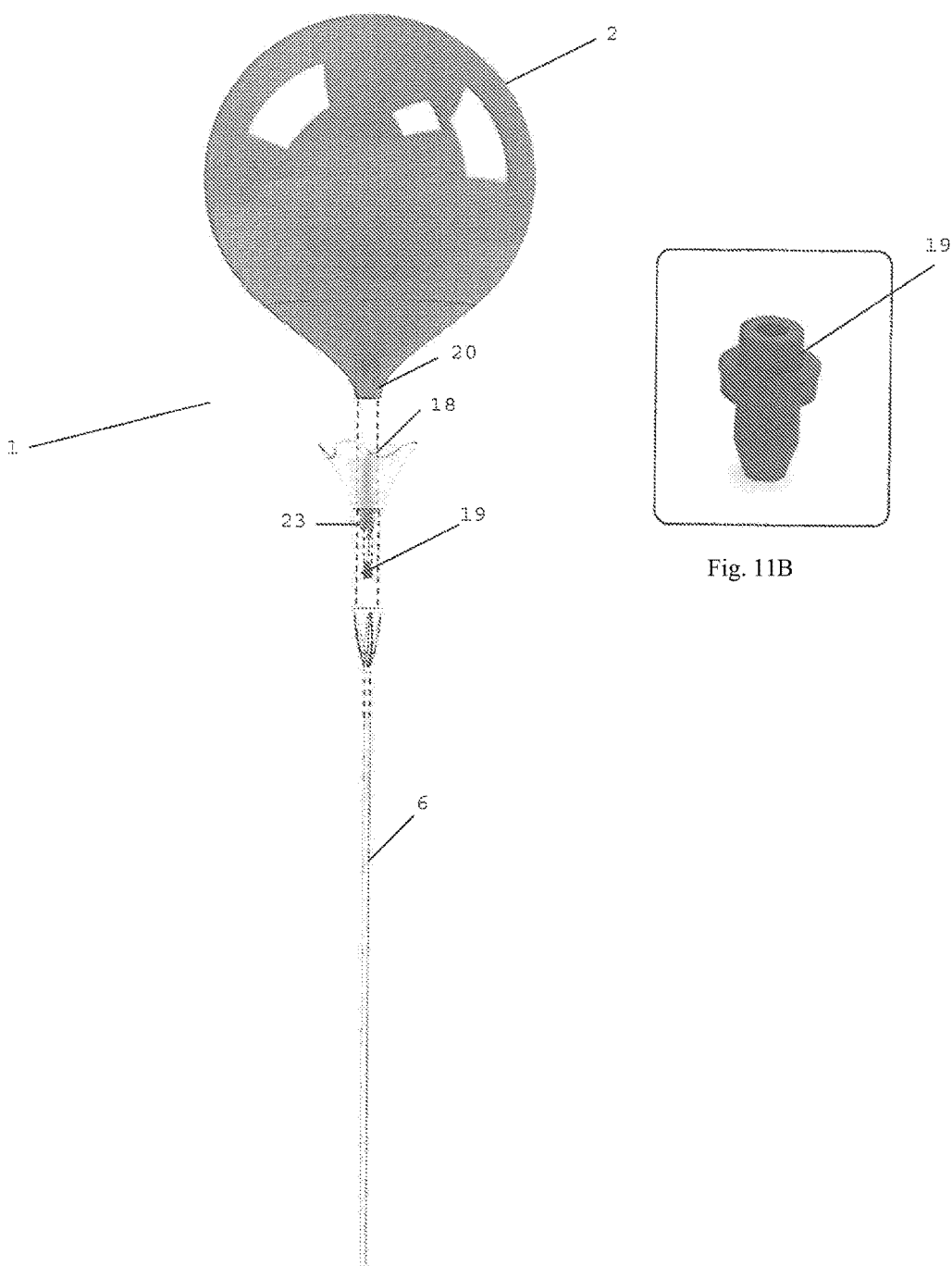
FIG. 11A: is a helium-free balloon assembly with a non-integral valve component in one embodiment thereof.
FIG. 11B: is a non-integral valve in one embodiment thereof

Referring generally to FIG. 11, in another embodiment, a helium-free balloon assembly (1) may include a balloon support coupler (23) having one or more integral or transient support extensions (18). In a preferred embodiment, such extension may be configured to be coupled with an internal fitting (20) that may be secured in a helium-free balloon aperture such as can be accomplished through rotationally molding a helium-free balloon (2) with an internal fitting (20) such as those described in U.S. patent application Ser. No. 14/201,665, (which is incorporated herein in its entirety.) In a preferred embodiment, an internal fitting may be manufactured from a plastic or composite material such as PVC or the like. Again, in a preferred embodiment, a support extension (18) may be inserted into an internal fitting (20) forming a sealed fitted or pressure coupling. In additional embodiments, this coupling may include a threaded coupling, a slide lock coupling, a snap lock coupling, a flanged coupling.

Again referring to FIG. 11, in one embodiment an inflation valve (19) may be incorporated into the assembly. In a preferred embodiment, an inflation valve (19) may be secured by said balloon support (3). In some embodiments this inflation valve (19) may be secured in the support extension (18), the internal fitting (20) or the support cup (3) or even a rod coupler (5). In one preferred embodiment, an inflation valve (19) may be secured in a balloon support coupler (23), which may further be coupled to a rod coupler (5), rod (6) or other component. In this configuration a helium-free balloon (2) may be inflated and deflated while secured to the balloon assembly (1) without the need for an inflation port (21) and separate plug (22) enhancing the aesthetic appearance of the display and mimicking more effectively the appearance of a lighter than air balloon. In certain embodiments, this inflation valve (19) may be integral with the support coupler (23), or other component, or even secured through an overmold or other securement process, while in other embodiments it may be a separate system component.

Referring to FIGS. 8 and 12, in another additional embodiment, the invention may include rod supports that may support one or more balloon assemblies. In a preferred embodiment, one or more helium-free balloon assemblies (1) may be secured to a vertical attachment surface through vertical rod support (14). In one embodiment, a vertical rod support (14) may be affixed to an attachment surface using screws, nails or bolts and the like inserted through one or more support attachment positions (16). In an alternative embodiment, a vertical rod support (14) may be secured to an attachment surface using an adhesive, such as an adhesive or foam tape positioned on the back of the support on one or more adhesive attachment positions (17).

Figures 12A, 12B, 12C:
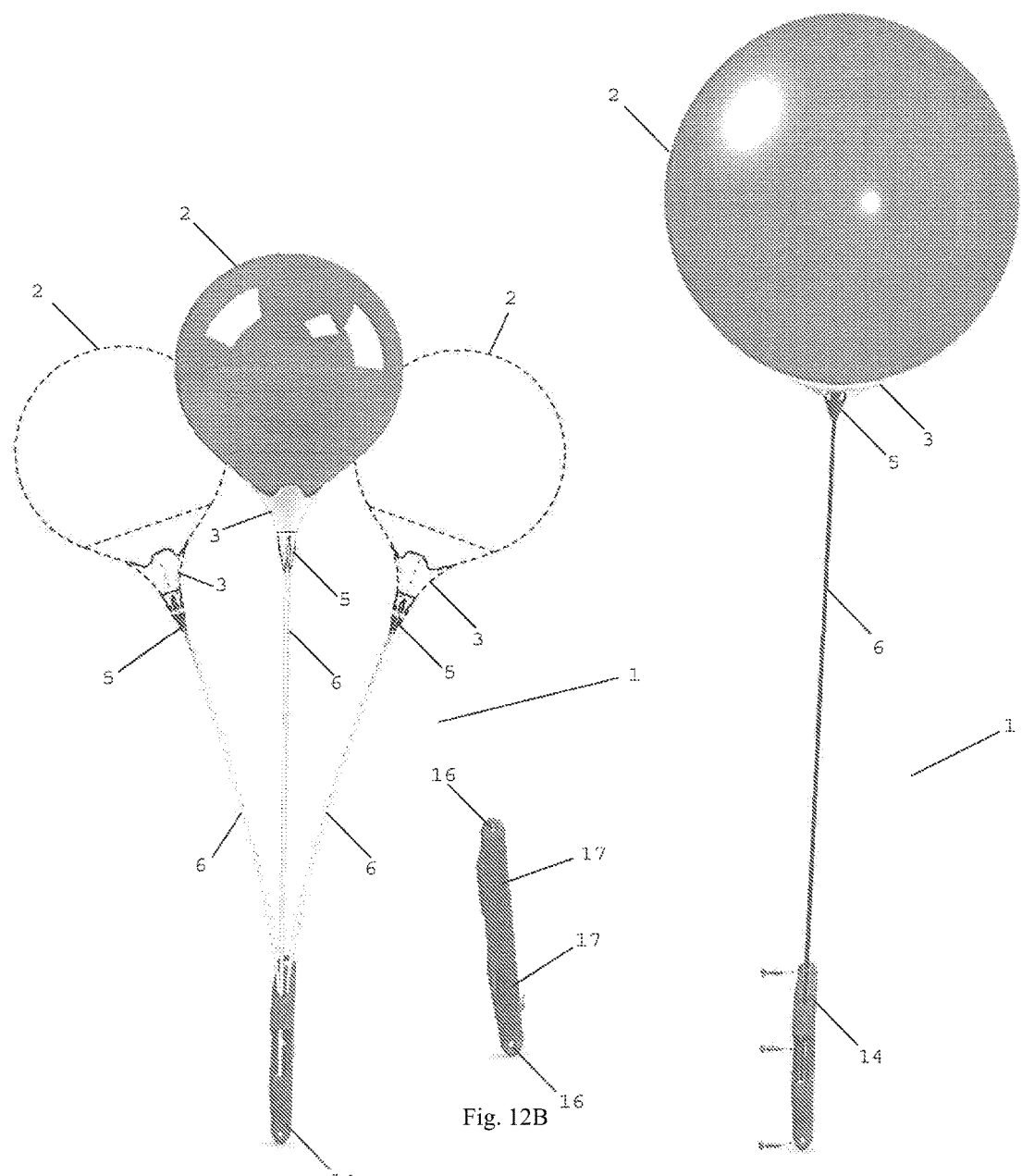
FIG. 12A: is a helium free balloon assembly having and isolated vertical rod support in one embodiment thereof
FIG. 12B: is an isolated vertical rod support in one embodiment thereof.
FIG. 12C: is a helium free balloon assembly having and isolated vertical rod support in one embodiment thereof.

In a preferred embodiment shown in FIGS. 11 and 12, such a vertical rod support (14) may include a single, or even a plurality of rod apertures (15) configured to secure a balloon assembly rod (6), rod handle (7), support pole (8) or even a coupler (4). In a preferred embodiment, shown in FIG. 12A, a plurality of helium-free balloon assemblies (1), in this case an assembly having a helium-free balloon (2) with a support extension (18) coupled with an internal fitting (20) and a balloon support coupler (23) secured to a rod coupler (5). In this preferred embodiment, a rod coupler (5) coupled with a rod (6), perhaps through an overmold. This rod is inserted into a rod aperture (15) on the vertical rod support (14) securing the assembly. Additional embodiments not specifically shown may include a stand having one or more rod apertures (15) configured to secure a balloon assembly rod (6), rod handle (7), support pole (8) or even a coupler (4).

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves systems, methods, techniques as well as devices to accomplish a helium-free balloon assembly and the like. In this application, the methods and apparatus for the aforementioned systems are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention. As can be easily understood from the foregoing, the basic concepts of the present invention may be embodied in a variety of ways. It involves both techniques as well as devices to accomplish the appropriate system. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in method-oriented terminology, each element of the claims corresponds to a device. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "supporting method and/or technique, and/or device" and even a "means for supporting." Such changes and alternative terms are to be understood to be explicitly included in the description.

Any patents, publications, or other references mentioned in this application for patent, such as in the specification or an IDS are hereby incorporated herein by reference in their entirety. Any priority case(s) claimed by this application is hereby appended and hereby incorporated herein by reference in their entirety. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated herein by reference in their entirety. Finally, all references listed in the list of References To Be Incorporated By Reference In Accordance With The Patent Application or other information disclosure statement and the like filed with the application are hereby appended and hereby incorporated herein by reference in their entirety, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the methods and/or apparatus for providing a helium-free balloon assembly system as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that this application also provides support for any combination of elements in the claims and even incorporates any desired proper antecedent basis for certain claim combinations such as with combinations of method, apparatus, process, and the like claims.

Any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The inventive subject matter is to include, but certainly not be limited as, a system substantially as herein described with reference to any one or more of the Figures and Description (including the following: for example, the process according to any claims and further comprising any of the steps as shown in any Figures, separately, in any combination or permutation).

Finally, Applicant reserves the right to seek additional design patent protection over the claimed invention, such that the drawings are fully enabled so as to allow one of ordinary skill in the art to know that the claimed design was in Applicant's possession at the time of filing. As such, it should be noted that any broken lines are to be included for the purpose of illustrating environmental matter and form no part of the claimed design should such become necessary.

What is claimed is:

1. A helium-free balloon assembly comprising:
    at least one coupler configured to be coupled with a balloon support;
    at least one rod coupler configured to be secured with said coupler and at least one rod;
    a helium-free balloon configured to be supported by said balloon support; and
    at least one helium-free balloon handle configured to be secured with said helium-free balloon through at least one balloon latch on said rod coupler.

2. A helium-free balloon assembly as described in claim 1 wherein said coupler comprises a coupler selected from the group consisting of: a threaded coupler; a fitted coupler; a twist lock coupler; a snap lock coupler; a flexible coupler; and a quick release coupler.

3. A helium-free balloon assembly as described in claim 1 wherein said coupler comprises a valve.

4. A helium-free balloon assembly as described in claim 1 wherein said coupler comprises a coupler configured to be secured in a secured coupler channel on said balloon support.

5. A helium-free balloon assembly as described in claim 1 wherein said rod coupler comprises a rod coupler having at least one fastener configured to be secured with said coupler.

6. A helium-free balloon assembly as described in claim 1 wherein said rod coupler comprises a rod coupler secured to said rod through an overmold.

7. A helium-free balloon assembly as described in claim 1 wherein said rod comprises a rod selected from the group consisting of: a flexible rod; a stationary rod; a pole; a jointed rod; a support plate; a ground stake; and a support stand.

8. A helium-free balloon assembly as described in claim 1 wherein said balloon support comprises a balloon support selected from the group consisting of: a planar balloon support cup; a substantially circular balloon support cup; and a scalloped balloon support cup; a rigid balloon support cup; and a flexible balloon support cup.

9. A helium-free balloon assembly as described in claim 1 wherein said helium-free balloon handle comprises at least one integral helium-free balloon handle configured to be secured with said helium-free balloon through at least one balloon latch on said rod coupler.

10. A helium-free balloon assembly as described in claim 1 and further comprising at least one rod handle configured to be coupled with said rod.

11. A helium-free balloon assembly as described in claim 10 wherein said rod handle comprises a rod handle configured to be coupled with a support pole.

12. A helium-free balloon assembly as described in claim 10 wherein said rod handle comprises a rod handle coupled with said rod through an overmold.

13. A helium-free balloon assembly as described in claim 1 and further comprising a vertical rod support configured to secure one or more helium-free balloon assemblies.

14. A helium-free balloon assembly as described in claim 13 wherein said vertical rod support configured to secure one or more helium-free balloon assemblies comprises a vertical rod support having one or more rod apertures configured to secure one or more helium-free balloon assemblies.

15. A helium-free balloon assembly as described in claim 14 wherein said vertical rod support comprises a vertical rod support having at least one support attachment position.

16. A helium-free balloon assembly as described in claim 14 wherein said vertical rod support comprises a vertical rod support having at least one adhesive attachment position.

17. An integrated seamless helium-free balloon assembly comprising:
at least one coupler configured to be coupled with a balloon support and a seamless helium-free balloon wherein said seamless helium-free balloon is configured to be supported by said balloon support;
at least one rod coupler configured to be secured with said coupler and at least one rod; and
at least one helium-free balloon handle configured to be secured with said helium-free balloon with at least one balloon latch on said rod coupler.

18. An integrated seamless helium-free balloon assembly as described in claim 17 wherein said coupler comprises a coupler selected from the group consisting of: a threaded coupler; a fitted coupler; a twist lock coupler; a snap lock coupler; a flexible coupler; and a quick release coupler.

19. An integrated seamless helium-free balloon assembly as described in claim 17 wherein said coupler comprises a valve.

20. An integrated seamless helium-free balloon assembly as described in claim 17 wherein said coupler comprises a coupler configured to be secured in a secured coupler channel on said balloon support.

21. An integrated seamless helium-free balloon assembly as described in claim 17 wherein said rod coupler comprises a rod coupler having at least one fastener configured to be secured with said coupler.

22. An integrated seamless helium-free balloon assembly as described in claim 17 wherein said rod coupler comprises a rod coupler secured to said rod through an overmold.

23. An integrated seamless helium-free balloon assembly as described in claim 17 wherein said rod comprises a rod selected from the group consisting of: a flexible rod; a stationary rod; a pole; a jointed rod; a support plate; a ground stake; and a support stand.

24. An integrated seamless helium-free balloon assembly as described in claim 17 wherein said balloon support comprises a balloon support selected from the group consisting of: a planar balloon support cup; a substantially circular balloon support cup; and a scalloped balloon support cup; a rigid balloon support cup; and a flexible balloon support cup.

25. An integrated seamless helium-free balloon assembly as described in claim 17 and further comprising at least one rod handle configured to be coupled with said rod.

26. An integrated seamless helium-free balloon assembly as described in claim 25 wherein said rod handle comprises a rod handle configured to be coupled with a pole.

27. An integrated seamless helium-free balloon assembly as described in claim 17 wherein said rod handle comprises a rod handle coupled with said rod through an overmold.

28. An integrated seamless helium-free balloon assembly as described in claim 17 wherein said seamless helium-free balloon comprises at least one seamless helium-free balloon inflation port.

29. An integrated seamless helium-free balloon assembly as described in claim 17 wherein said seamless helium-free balloon comprises at least one seamless helium-free balloon plug.

30. An integrated seamless helium-free balloon assembly as described in claim 17 and further comprising a vertical rod support configured to secure one or more helium-free balloon assemblies.

31. An integrated seamless helium-free balloon assembly as described in claim 30 wherein said vertical rod support configured to secure one or more helium-free balloon assemblies comprises a vertical rod support having one or more rod apertures configured to secure one or more helium-free balloon assemblies.

32. An integrated seamless helium-free balloon assembly as described in claim 31 wherein said vertical rod support comprises a vertical rod support having at least one support attachment position.

33. An integrated seamless helium-free balloon assembly as described in claim 31 wherein said vertical rod support comprises a vertical rod support having at least one adhesive attachment position.

34. A helium-free balloon valve assembly comprising:
at least one helium-free balloon having at least one internal fitting;
at least one balloon support having at least one support extension configured to be coupled with said internal fitting;
at least one rod coupler configured to be coupled with said balloon support and at least one rod; and
at least one inflation valve configured to be secured by said balloon support so as to allow said helium-free balloon to be inflated when coupled to said balloon support.

35. A helium-free balloon valve assembly as described in claim 34 wherein said internal fitting comprises an internal fitting selected from the group consisting of: a threaded internal fitting; a slide lock internal fitting; a snap lock internal fitting; a flanged internal fitting; and an integral internal fitting.

36. A helium-free balloon valve assembly as described in claim 34 wherein said balloon support comprises a balloon support having a balloon support coupler.

37. A helium-free balloon valve assembly as described in claim 36 wherein said balloon support coupler comprises a balloon support coupler selected from the group consisting of: a threaded balloon support coupler; a fitted balloon support coupler; a twist lock balloon support coupler; a snap lock balloon support coupler; a flexible balloon support coupler; and a quick release balloon support coupler; and integral balloon support coupler; a valved balloon support coupler; and a valve.

38. A helium-free balloon valve assembly as described in claim 34 wherein said balloon support comprises a balloon support selected from the group consisting of: a planar balloon support cup; a substantially circular balloon support cup; and a scalloped balloon support cup; a rigid balloon support cup; and a flexible balloon support cup.

39. A helium-free balloon valve assembly as described in claim 34 wherein said balloon support comprises a balloon support coupler wherein said support extension and said rod coupler are a single integral component.

40. A helium-free balloon valve assembly as described in claim 34 wherein said rod comprises a rod selected from the group consisting of: a flexible rod; a stationary rod; a pole; a jointed rod; a support plate; a ground stake; and a support stand.

41. A helium-free balloon valve assembly as described in claim 34 and further comprising at least one rod handle configured to be coupled with said rod.

42. A helium-free balloon valve assembly as described in claim 41 wherein said rod handle comprises a rod handle configured to be coupled with a pole.

43. A helium-free balloon valve assembly as described in claim 34 and further comprising a vertical rod support configured to secure one or more helium-free balloon assemblies.

44. A helium-free balloon valve assembly as described in claim 43 wherein said vertical rod support configured to secure one or more helium-free balloon assemblies comprises a vertical rod support having one or more rod apertures configured to secure one or more helium-free balloon assemblies.

45. A helium-free balloon valve assembly as described in claim 44 wherein said vertical rod support comprises a vertical rod support having at least one support attachment position.

46. A helium-free balloon valve assembly as described in claim 44 wherein said vertical rod support comprises a vertical rod support having at least one adhesive attachment position.

* * * * *